US012792727B2

(12) United States Patent
Wennerstrum et al.

(10) Patent No.: US 12,792,727 B2
(45) Date of Patent: Nov. 10, 2026

(54) MULTI-SITUATIONAL HOLISTIC USER TRUST SYSTEM

(71) Applicant: BANK OF AMERICA CORPORATION, Charlotte, NC (US)

(72) Inventors: Daniel Wennerstrum, Chicago, IL (US); Sandra L. Dube, Salt Lake City, UT (US); Manu Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 14 days.

(21) Appl. No.: 18/918,866

(22) Filed: Oct. 17, 2024

(65) Prior Publication Data

US 2026/0111539 A1 Apr. 23, 2026

(51) Int. Cl.
*G06F 21/00* (2013.01)
*G06F 21/55* (2013.01)
*G06F 21/60* (2013.01)

(52) U.S. Cl.
CPC .......... *G06F 21/552* (2013.01); *G06F 21/604* (2013.01)

(58) Field of Classification Search
CPC ............................. G06F 21/552; G06F 21/604
See application file for complete search history.

(56) References Cited

U.S. PATENT DOCUMENTS 7,886,334 B1 2/2011 Walsh
9,882,911 B2 1/2018 Baltar
9,928,290 B2 3/2018 Tiell
10,798,109 B2 10/2020 Ford
10,834,097 B2 11/2020 Ford
11,004,006 B2 5/2021 Bandyopadhyay
11,582,108 B2 2/2023 Ciulla
11,757,902 B2 9/2023 Ford
11,841,946 B1 * 12/2023 Durvasula ............... G06F 21/53
11,900,479 B2 2/2024 Chrapko
2014/0258305 A1 9/2014 Kapadia
2016/0055555 A1 2/2016 Mills
2017/0195359 A1 7/2017 Grigoryan
2019/0165941 A1 5/2019 Ray
2019/0387002 A1 12/2019 Ford
2021/0042755 A1 * 2/2021 Nolte .................... H04L 9/3247
2021/0352075 A1 * 11/2021 Thirumalai ............ G06Q 50/01

(Continued)

*Primary Examiner* — Rodman Alexander Mahmoudi
(74) *Attorney, Agent, or Firm* — Moore & Van Allen PLLC; Nicholas C. Russell

(57) ABSTRACT

A holistic group trust indicator for linked users that has multi-situational application. Data instances incurred by the linked users are monitored and AI including ML is implemented to predict future data instances likely to be incurred by the linked users. In response, a holistic group trust indicator is generated for the linked users that is based, at least, on the actual and predicted future data instances. In response to a data advancement/guarantee request associated with two or more of the linked users, a decision is made on the data advancement/guarantee based, at least, on the holistic group trust indicator. The holistic group trust indicator may be generated dynamically when a data advancement/guarantee request is received. While in other instances, actual data instance and predicted future data instance are continuously received and the holistic group trust indicator is continuously/constantly updated.

20 Claims, 4 Drawing Sheets

(56) References Cited

U.S. PATENT DOCUMENTS

| | | | | |
|---|---|---|---|---|
| 2021/0389854 | A1* | 12/2021 | Rose | G06F 3/0482 |
| 2022/0300538 | A1 | 9/2022 | Chrapko | |
| 2023/0300150 | A1 | 9/2023 | O'Neill | |
| 2024/0098086 | A1 | 3/2024 | Iranitalab | |
| 2025/0036960 | A1 | 1/2025 | Subramanya | |

* cited by examiner

MULTI-SITUATIONAL HOLISTIC USER TRUST SYSTEM

FIELD OF THE INVENTION

The present invention is generally directed to computing security and, more specifically, generating a multi-user trust indicator and using the multi-party trust indicator to decision data advancements/guarantees between two or more of the users.

BACKGROUND

Typically, when a user agrees to assure a data advancement, the data advancing entity relies on the trust indicator of that user for determining whether to proceed with the data advancement. However, the trust indicator of the assuring user may be inadequate, in that the trust indicator is devoid of factoring in the linkage between the assuring user and the assured user and typically is only based on historical data instances. Further, when a user agrees to assure a data advancement, such action may negatively impact the trust indicator of that user.

Therefore, a need exists to develop systems, computer-implemented methods, computer program products or the like that serve to provide a more robust trust indicator for users that may be linked. The desired trust indicator should not rely solely on one user's data instances, but rather should take into account the data instances of all the linked users. In addition, the robustness of such a trust indicator may be increased by not limiting the determinative factors to historical data instances. Moreover, generation and use of such a trust indicator should not, in and of itself, negatively impact individual trust indicator(s) of the linked users.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a holistic group trust indicator for linked users that has multi-situational application. In this regard, the present invention monitors the data instances incurred by the linked users and uses Artificial Intelligence (AI) including Machine Learning (ML) to predict future data instances likely to be incurred by the linked users. In response, a holistic group trust indicator is generated for the linked users that is based, at least, on the actual and predicted future data instances. The holistic group indicator provides an indication of the data advancement worthiness of the linked users. When a data advancement/guarantee request is undertaken by two or more of the linked users, a decision is made on the data advancement/guarantee based, at least, on the holistic group trust indicator.

In specific embodiments of the invention, the holistic group trust indicator is generated dynamically when a data advancement/guarantee request is received (i.e., on-the-fly). While in other embodiments of the invention, actual data instance and predicted future data instance are continuously received and the holistic group trust indicator is continuously/constantly updated.

In other specific embodiments of the invention, individual user trust indicators are generated for each of linked users that are based, at least, on the actual and predicted future data instances of each linked user. In such embodiments of invention, the individual user trust indicators are used to decision data advancements/guarantees associated with the individual user.

In additional specific embodiments of the invention, the application used to perform the decisioning is stored in an isolated sandbox, such that decisions based on the holistic group trust indicator do not impact the individual user trust indicators and/or decisions based on any one of the individual user trust indicators do not impact the holistic group trust indicator. In other specific embodiments of the invention, the holistic group trust indicator and/or individual user trust indicators are stored in isolated sandboxes, such that updates to the holistic group trust indicator do not impact the individual user trust indicators and/or updates to the individual user trust indicators do not impact the holistic group trust indicator.

A system for holistic trust indication defines first embodiments of the invention. Thew system includes a computing platform having a memory and one or more computing processor devices in communication with the first memory. The memory stores a monitoring engine executable by at least one of the computing processor device(s) and configured to monitor for data instances incurred by each of a plurality of linked data users. Further, the memory stores an Artificial Intelligence (AI)-based prediction engine executable by at least one of the computing processor device(s) and configured to receive from the monitoring engine the data instances incurred by each of the plurality of linked data users, and implement one or more Machine Learning (ML) models to predict future data instances likely to be incurred by each of the plurality of linked data users based, at least, on the data instances incurred by each of the plurality of linked data users.

In addition, the memory includes a trust indicator generation engine this is executable by at least one of the computing processor device(s). The trust indicator generation engine is configured to receive, (i) from the monitoring engine, the data instances incurred by each of the plurality of linked data users and (ii) from the AI-based prediction engine the predicted future data instances likely to be incurred by each of the plurality of linked data users, and generate a holistic group trust indicator for the plurality of linked data users based, at least on the data instances incurred by each of the plurality of linked data users and the predicted future data instances likely to be incurred by each of the plurality of linked data users. The holistic group trust indicator indicates the data advancement worthiness of the plurality of linked users. Further, the memory stores a data decisioning engine executable by at least one of the computing processor device(s) and configured to receive a first data advancement or first data guarantee request associated with at least two of the plurality of linked data users, and decision the first data advancement or first data guarantee request based at least on the holistic group trust indicator.

In specific embodiments of the system, the trust indicator generation engine is further configured to receive notification from the data decisioning engine of the data advancement or data guarantee request, and, in response to receiving the notification, receive (i) and (ii) and generate the holistic group trust indicator. In this regard, the holistic group trust indicator is generated dynamically, in response to receiving notification of a data advancement or data guarantee request.

In other specific embodiments of the system the trust indicator generation engine is further configured to continuously receive, (i) from the monitoring engine, the data instances incurred by each of the plurality of linked data users and (ii) from the AI-based prediction engine, the predicted future data instances likely to be incurred by each of the plurality of linked data users, and initially generate and continuous update the holistic group trust indicator for the plurality of linked data users.

In related embodiments of the system, the trust indicator generation engine is configured to initially generate and continuously update individual user trust indicators for each of the plurality of linked data users based, at least on the data instances incurred by corresponding ones of the plurality of linked data users and the predicted future data instances likely to be incurred by the corresponding ones of the plurality of linked data users. Individual user trust indicators indicate the data advancement worthiness of each of the plurality of linked users. In further related embodiments of the system, the data decisioning engine is further configured to receive a second data advancement or a second data guarantee request associated with one of the plurality of linked data users, and decision the second data advancement or second data guarantee request based at least on the individual user trust indicator associated with the one of the plurality of linked data users.

In other related embodiments of the system, the memory comprises an isolated sandbox. In such embodiments of the system, the data decisioning engine may be stored in the isolated sandbox and decisions on (i) the first data advancement or the first data guarantee request made by the data decisioning engine do not result in updates to the individual user trust indicators and (ii) the second data advancement or the second data guarantee request made by the data decisioning engine do not result in updates to the holistic group trust indicator. In other such embodiments of the system, the holistic group trust indicator is stored in the isolated sandbox, such that continuous updates to the holistic group indicator do not result in updates to the individual user trust indicators. Moreover, in other such embodiments of the system, the individual user trust indicators are stored in the isolated sandbox, such that the continuous updates to the individual user trust indicators do not result in updates to the holistic group trust indicator.

A computer-implemented method for holistic trust indication defines second embodiments of the invention. The computer-implemented is method is executed by one or more computing processor devices. The computer-implemented method includes monitoring for data instances incurred by each of a plurality of linked data users and implementing one or more Machine Learning (ML) models to predict future data instances likely to be incurred by each of the plurality of linked data users based, at least, on the data instances incurred by each of the plurality of linked data users. The computer-implemented method further includes generating a holistic group trust indicator for the plurality of linked data users based, at least on the data instances and the predicted future data instances. The holistic group trust indicator indicates the data advancement worthiness of the plurality of linked users. Further, the computer-implemented method includes receiving a first data advancement or first data guarantee request associated with at least two of the plurality of linked data users, and decisioning the first data advancement or first data guarantee request based at least on the holistic group trust indicator.

In specific embodiments of the computer-implemented method, generating the holistic group indicator occurs in response to receiving the first data advancement or the first data guarantee request associated with at least two of the plurality of linked data users. In this regard, the holistic group trust indicator is generated dynamically, in response to receiving the data advancement or data guarantee request.

In other specific embodiments, the computer-implemented method further includes continuously updating the holistic group trust indicator for the plurality of linked data users based, at least on further data instances incurred by each of the plurality of linked data users and further predicted future data instances likely to be incurred by each of the plurality of linked data users.

In related embodiments, the computer-implemented method further includes generating individual user trust indicators for each of the plurality of linked data users based, at least on the data instances incurred by corresponding ones of the plurality of linked data users and the predicted future data instances likely to be incurred by the corresponding ones of the plurality of linked data users. The individual user trust indicators indicate the data advancement worthiness of each of the plurality of linked users, and continuously updating the individual user trust indicators for each of the plurality of linked data users based, at least, on further data instances incurred by corresponding ones of the plurality of linked data users and further predicted future data instances likely to be incurred by the corresponding ones of the plurality of linked data users. In further related embodiments the computer-implemented method includes receiving a second data advancement or a data guarantee request associated with one of the plurality of linked data users, and decisioning the second data advancement or second data guarantee request based at least on the individual user trust indicator associated with the one of the plurality of linked data users.

In still further related embodiments, the computer-implemented method includes generating and storing at least one of the holistic group trust indicator and the individual user trust indicators in an isolated sandbox. Generating and storing the holistic group trust indicator in the isolated sandbox provides for updates to the holistic group indicator not causing updates to the individual user trust indicators and wherein generating and storing the individual user trust indicators in an isolated sandbox provides for updates to the individual user trust indicators not causing updates to the holistic group indicators.

A computer program product including a non-transitory computer-readable medium defines third embodiments of the invention. The non-transitory computer-readable medium includes sets of codes. The sets of codes cause computing device(s) to monitor for data instances incurred by each of a plurality of linked data users and implement one or more Machine Learning (ML) models to predict future data instances likely to be incurred by each of the plurality of linked data users based, at least, on the data instances incurred by each of the plurality of linked data users. The sets of code further cause the computing device(s) to generate a holistic group trust indicator for the plurality of linked data users based, at least on the data instances incurred by each of the plurality of linked data users and the predicted future data instances likely to be incurred by each of the plurality of linked data users. The holistic group trust indicator indicates the data advancement worthiness of the plurality of linked users. Moreover, the sets of codes cause the computing device(s) to receive a first data advancement or first data guarantee request associated with at least two of the plurality of linked data users, and decision the first data advancement or first data guarantee request based at least on the holistic group trust indicator.

In specific embodiments of the computer program product, the set of codes for causing the one or more computing devices to generate the holistic group indicator occur in response to the set of codes for causing the computing device(s) to receive the first data advancement or the first data guarantee request associated with at least two of the plurality of linked data users.

In other specific embodiments of the computer program product, the sets of codes further includes a set of codes for causing the computing device(s) to continuously update the holistic group trust indicator for the plurality of linked data users based, at least on further data instances incurred by each of the plurality of linked data users and further predicted future data instances likely to be incurred by each of the plurality of linked data users.

In related specific embodiments of the computer program product, the sets of codes further include a set of codes for causing the computing device(s) to generate individual user trust indicators for each of the plurality of linked data users based, at least on the data instances incurred by corresponding ones of the plurality of linked data users and the predicted future data instances likely to be incurred by the corresponding ones of the plurality of linked data users. The individual user trust indicators indicate the data advancement worthiness of each of the plurality of linked users. The sets of code further include a set of code for causing the computing device(s) to continuously update the individual user trust indicators for each of the plurality of linked data users based, at least, on further data instances incurred by corresponding ones of the plurality of linked data users and further predicted future data instances likely to be incurred by the corresponding ones of the plurality of linked data users.

In related embodiments of the computer program product, the sets of codes further include sets of codes for causing the computing device(s) to receive a second data advancement or a data guarantee request associated with one of the plurality of linked data users; and decision the second data advancement or second data guarantee request based at least on the individual user trust indicator associated with the one of the plurality of linked data users.

In still further related embodiments of the computer program, the set of codes for causing the computing device (s) to generate the of the holistic group trust indicator and generate the individual user trust indicators occur within an isolated sandbox. In addition, the sets of codes further include a set of codes for causing the computing device(s) to store the holistic group trust indicator and the individual user trust indicators in the isolated sandbox. In such embodiments of the computer program product, generating and storing the holistic group trust indicator in the isolated sandbox provides for updates to the holistic group indicator not causing updates to the individual user trust indicators and generating and storing the individual user trust indicators in an isolated sandbox provides for updates to the individual user trust indicators not causing updates to the holistic group indicators.

Thus, as described in detail above, present embodiments of the invention include apparatus, methods, computer program products and/or the like that provide for a holistic group trust indicator for linked users that has multi-situational application. Data instances incurred by the linked users are monitored and AI including ML is implemented to predict future data instances likely to be incurred by the linked users. In response, a holistic group trust indicator is generated for the linked users that is based, at least, on the actual and predicted future data instances. In response to a data advancement/guarantee request associated with two or more of the linked users, a decision is made on the data advancement/guarantee based, at least, on the holistic group trust indicator. In specific embodiments of the invention, the holistic group trust indicator is generated dynamically when a data advancement/guarantee request is received (i.e., on-the-fly). While in other embodiments of the invention, actual data instance and predicted future data instance are continuously received and the holistic group trust indicator is continuously/constantly updated. In addition, the decisioning application and/or holistic group trust indicator may be isolated/sandboxed so that decisions based on the holistic group trust indicator or updates to the holistic group trust indicator do not impact trust indicators on the individual user-level.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
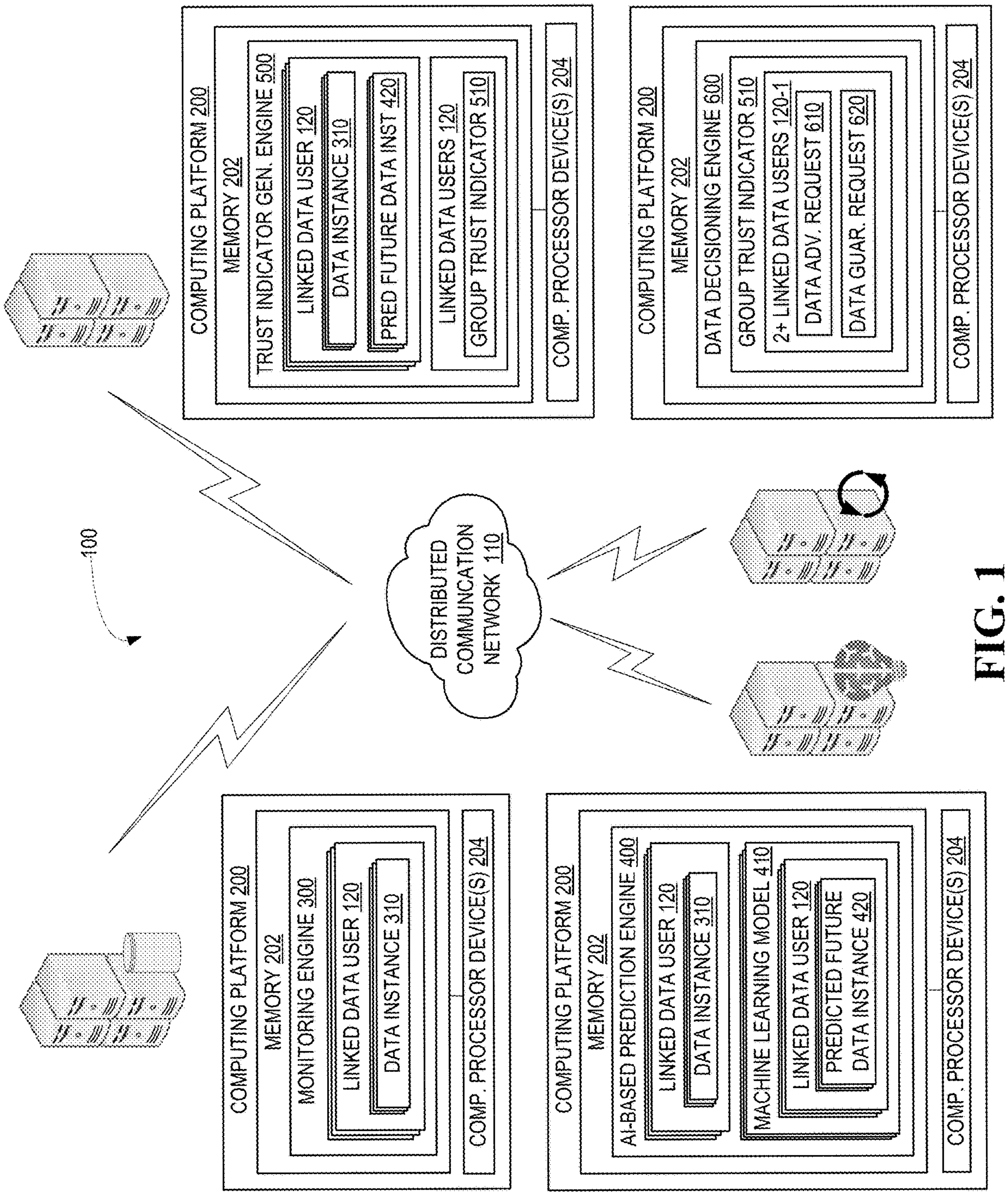
Figure 2:
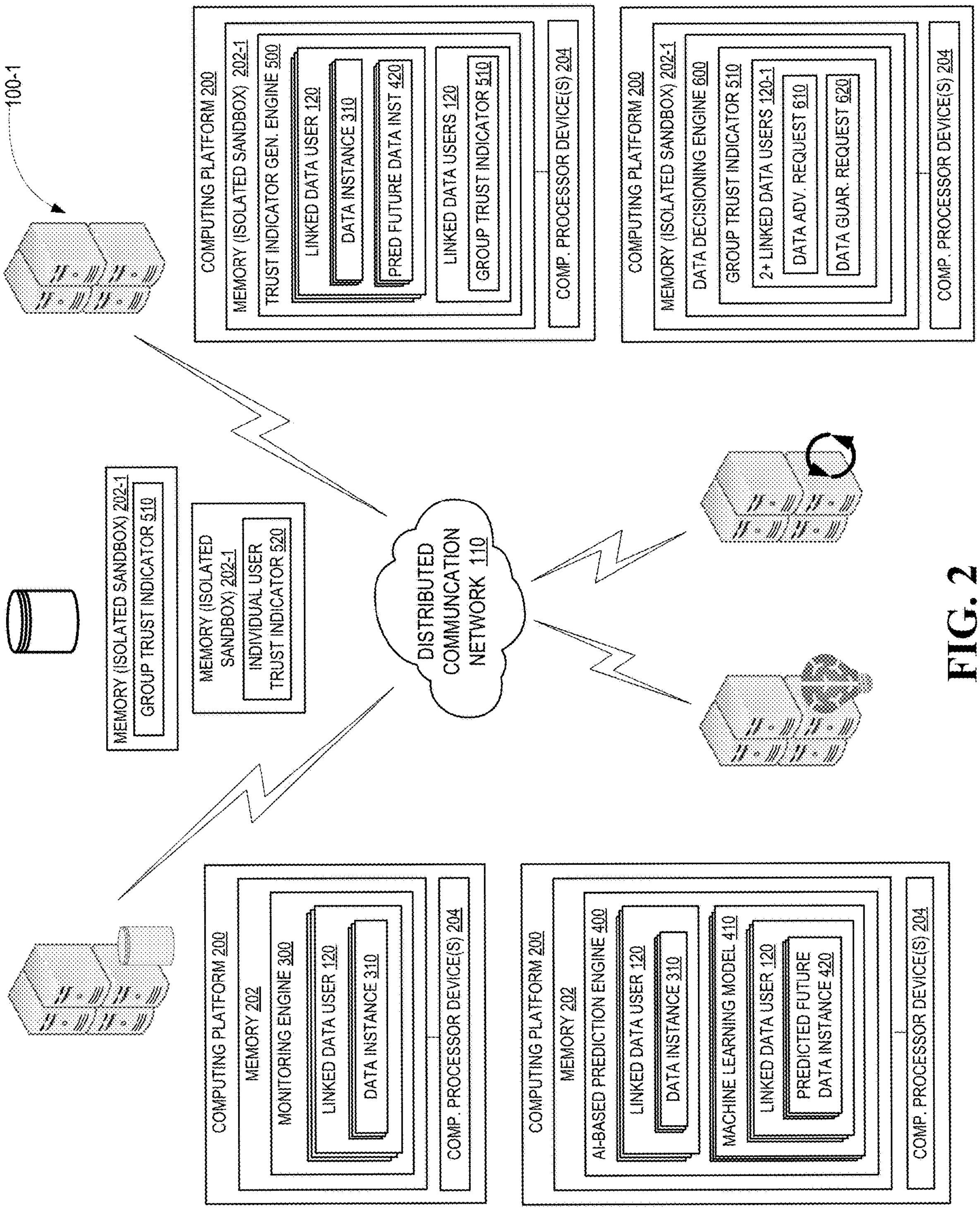
Figure 3:
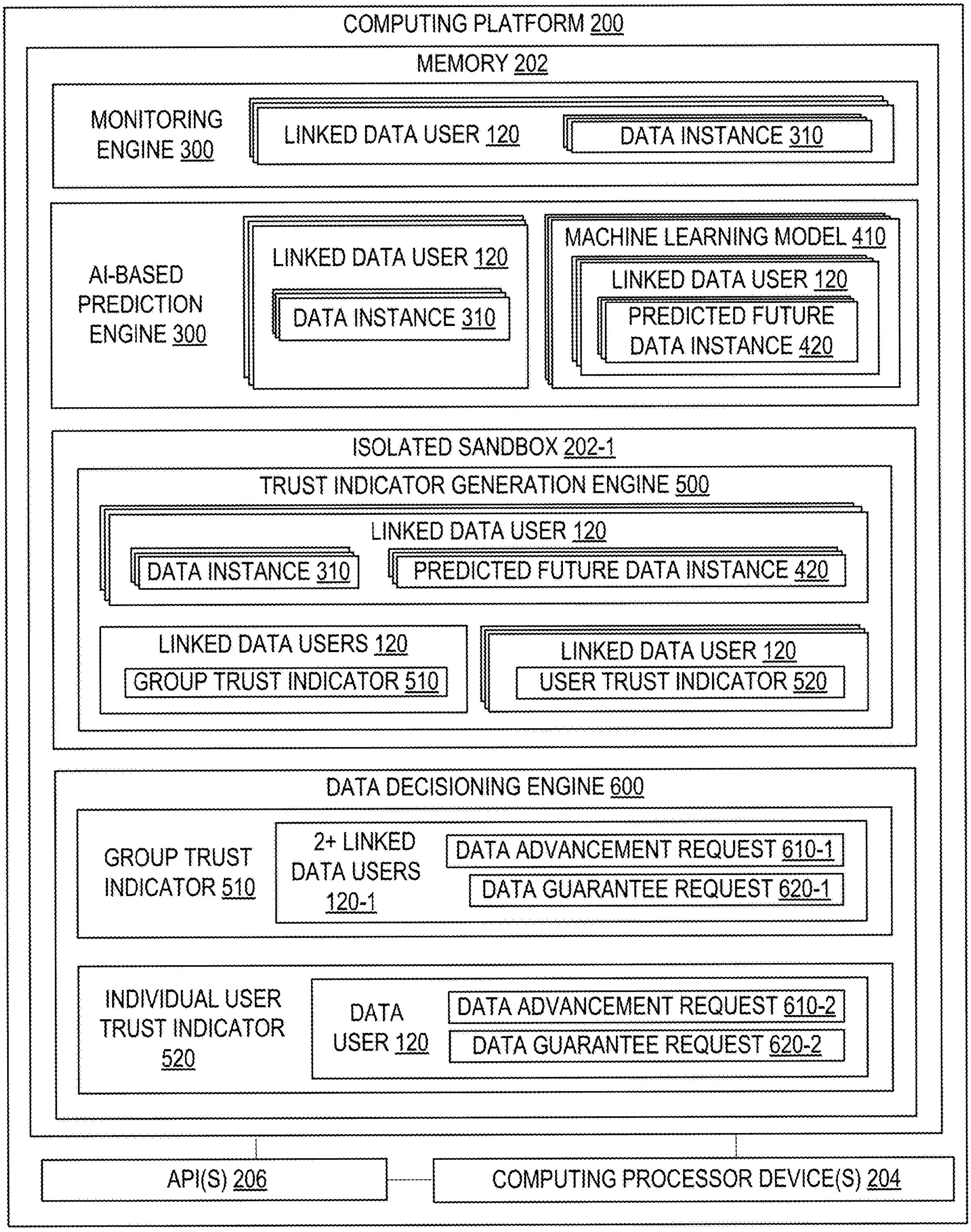
Figure 4:
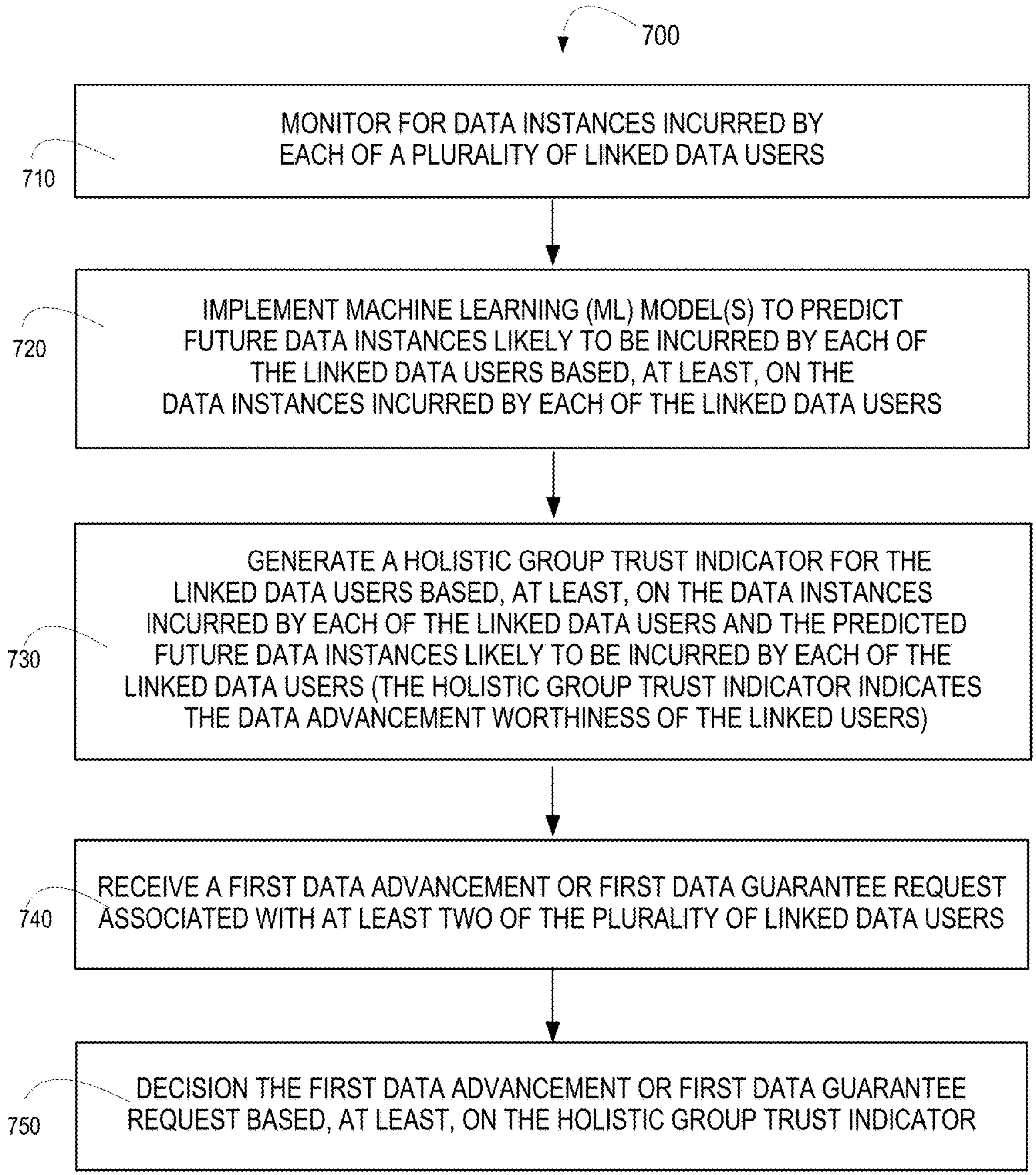

Having thus described embodiments of the disclosure in general terms, reference will now be made to the accompanying drawings, wherein:

FIG. 1 is a schematic/block of a system for holistic group trust indicator generation and implementation, in accordance with embodiments of the present invention;

FIG. 2 is a schematic/block diagram an alternate system for holistic trust generation and implementation using isolated sandbox memories to isolate a trust indicator generation engine, a data decisioning engine, a group trust indicator and/or an individual user indicator, in accordance with embodiments of the present invention;

FIG. 3 is a block diagram of a computing platform storing a monitoring engine, an artificial intelligence (AI)-based prediction engine, a trust indicator generation engine, and a data decisioning engine, in accordance with embodiments of present invention; and FIG. 4 is a flow diagram of a method for holistic group trust indicator generation and implementation, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, a.), or an embodiment combining software and hardware aspects that may be referred to herein as a "system. " Furthermore, embodiments of the present invention may take the form of a computer program product comprising a computer-usable storage medium having computer-usable program code/computer-readable instructions embodied in the medium.

Any suitable computer-usable or computer-readable medium may be utilized.

The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for conducting operations of embodiments of the present invention may be written in an object oriented, scripted, or unscripted programming language such as JAVA, PERL, SMALLTALK, C++, PYTHON, or the like. However, the computer program code/computer-readable instructions for conducting operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to conduct an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform includes a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for a holistic group trust indicator for linked users that has multi-situational application. In this regard, the present invention monitors the data instances incurred by the linked users and uses Artificial Intelligence (AI) including Machine Learning (ML) to predict future data instances likely to be incurred by the linked users. In response, a holistic group trust indicator is generated for the linked users that is based, at least, on the actual and predicted future data instances. The holistic group indicator provides an indication of the data advancement worthiness of the linked users. When a data advancement/guarantee request is undertaken by two or more of the linked users, a decision is made on the data advancement/guarantee based, at least, on the holistic group trust indicator.

In specific embodiments of the invention, the holistic group trust indicator is generated dynamically when a data advancement/guarantee request is received (i.e., on-the-fly). While in other embodiments of the invention, actual data instance and predicted future data instance are continuously received and the holistic group trust indicator is continuously/constantly updated.

In other specific embodiments of the invention, individual user trust indicators are generated for each of linked users that are based, at least, on the actual and predicted future data instances of each linked user. In such embodiments of invention, the individual user trust indicators are used to decision data advancements/guarantees associated with the individual user.

In additional specific embodiments of the invention, the application used to perform the decisioning is stored in an isolated sandbox, such that decisions based on the holistic group trust indicator do not impact the individual user trust indicators and/or decisions based on any one of the individual user trust indicators do not impact the holistic group trust indicator. In other specific embodiments of the invention, the holistic group trust indicator and/or individual user trust indicators are stored in isolated sandboxes, such that updates to the holistic group trust indicator do not impact the individual user trust indicators and/or updates to the individual user trust indicators do not impact the holistic group trust indicator.

Referring to FIG. 1, a schematic/block is presented of a system 100 for holistic trust indication, in accordance with embodiments of the present invention. The system 100 is implemented amongst a distributed communication network 110, which may include the Internet, one or more intranets, cellular network(s) or the like. The system includes a computing platform 200, which may comprise one, or as is shown in FIG. 1, multiple computing devices, such as servers or the like. Computing platform 200 includes memory 202 and one or more computing processor devices 204 in communication with 202.

Memory 202 of computing platform 200 stores monitoring engine 300, which is executable by at least one of the computing processor device(s) 204. Monitoring engine is configured to monitor for data instances 310, such as data transfers, data exchanges, data advancements or the like incurred by each of a plurality of linked data users 120. Memory 202 of computing platform 200 additionally stores an Artificial Intelligence (AI)-based prediction engine 400, which is executable by at least one of the computing processing device 204. AI-based prediction engine 400 is configured to receive, from the monitoring engine 300 the data instances 310 incurred by each of the plurality of linked data users 120 and, in response, implement one or more Machine Learning (ML) models 410 to predict future data instances 420 likely to be incurred by each of the plurality of linked data users 120 based, at least, on the data instances 310 incurred by each of the plurality of linked data users 120. For example, predicting future data transfers, data exchanges, data advancements and the like and the timing for such future data instances.

Memory 202 of computing platform 200 further stores trust indicator generation engine 500, which is executable by at least one of the computing processor device(s) 204. Trust indication generation engine 500 is configured to receive, from the monitoring engine 300, the data instances 310 incurred by each of the plurality of linked data users 120 and, from the AI-based prediction engine 400, the predicted future data instances 420 likely to be incurred by each of the plurality of linked data users 120. In response to receiving the data instances 310 and the predicted future data instances 420, trust indicator generation engine 500 is configured to generate a holistic group trust indicator 510 for the plurality (i.e., group) of linked data users 120 based, at least, on the data instances 310 incurred by each of the plurality of linked data users 120 and the predicted future data instances 420 likely to be incurred by each of the plurality of linked data users 120. The holistic group trust indicator 510 indicates the data advancement worthiness of the plurality of linked data users 120 (i.e., the data advancement worthiness of the group of users).

Memory 202 of computing platform 200 additionally stores data decisioning engine 600, which is executable by at least one of the computing processor device(s) 204. Data decisioning engine 500 is configured receive a data advancement request 610 or first data guarantee request 620 associated with at least two of the plurality of linked data users 120-1. In response to receiving data advancement request 610 or data guarantee request 620, decision the data advancement request 610 or first data guarantee request 620 based, at least, on the holistic group trust indicator 510. Decisioning provides for authorizing or denying the data advancement request 610 or data guarantee request 620.

Referring to FIG. 2, a system 100-1 for holistic trust indication is depicted, in accordance with embodiments of the present invention. The system 100-1 shown in FIG. 2 includes the same monitoring engine 300, AI-based prediction engine 400, trust indicator generation engine 500 and data decisioning engine 600, shown and described in FIG. 1. Thus, for the sake of brevity, the details associated with monitoring engine 300, AI-based prediction engine 400, trust indicator generation engine 500 and data decisioning engine 600 will not be discussed in relation to FIG. 2.

System 100-1 additionally includes an isolated sandbox 202-1 which part of the memory 202 of computing platform 200. In specific embodiments of the invention, isolated sandbox 202-1 is configured to store one or more of the trust indicator prediction engine 500 and the data decisioning engine 600, such that outputs resulting from the trust indicator generation engine 500 (i.e., the aforementioned trust indicators 510 and 520) and/or the data decisioning engine 600 (i.e., authorize/deny decisions for data advancement requests 610 or data guarantee requests 620) are isolated and unknown to other internal and external engines, applications, networked entities and the like.

In this regard, when the trust indicator prediction engine 500 generates or updates the holistic group trust indicator 510 no direct impact/change to any of the individual user trust indicators 520 incurs (however, the underlying data instances 310 or predicted future data instances 420 that led to the generation or update of the holistic group trust indicator 510 may impact individual user trust indicators 520). Conversely, when the trust indicator prediction engine 500 generates or updates an individual user trust indicator 520 no direct impact/change to any of the holistic group trust indicator 510 incurs (however, the underlying data instances 310 or predicted future data instances 420 that led to the generation or update of the individual user trust indicator 520 may impact the holistic group trust indicators 510). Further, when the data decisioning engine 600 renders a decision on a data advancement request 610 or a data guarantee request 620, no direct impact/change occurs to either the holistic group trust indicator 510 or any of the individual user trust indicators 520. It should be noted that the isolated sandbox 202-1 and stores the trust indicator engine 500 will be, in specific embodiments, a different isolated sandbox 202-1 than the one storing the data decisioning engine 600.

In other embodiments of the invention, either in addition to storing the one or more of the trust indicator prediction engine 500 and the data decisioning engine 600 in the isolated sandbox 202-1 or in lieu of storing the one or more of the trust indicator prediction engine 500 and the data decisioning engine 600 in the isolated sandbox 202-1, the holistic group trust indicator 510 and/or the individual user trust indicators 520 are stored in an isolated sandbox 202-1 of memory 200 such that trust indicators 510 and 520 are isolated and unknown to other internal and external engines, applications, networked entities and the like. It should be noted that the isolated sandbox 202-1 and stores the group trust indicator 510 will be, in specific embodiments, different from the isolated sandbox 202-1 than the one individual user trust indicators 520 and, where applicable, different from the isolated sandbox 202-1 storing the trust indicator prediction engine 500 and the data decisioning engine 600.

Referring to FIG. 3, a block diagram is depicted of computing platform 200 highlighting various alternate embodiments of the system shown and described in relation to FIG. 1, in accordance with embodiments of the present invention. Computing platform 200 may comprise one or multiple computing devices, such as servers or the like or the like. As previously discussed in relation to FIG. 1, computing platform 200 includes memory 202, which may comprise volatile and/or non-volatile memory, such as read-only memory (ROM) and/or random-access memory (RAM), EPROM, EEPROM, flash cards, or any memory common to computing platforms. Moreover, memory 202 may comprise cloud storage, such as provided by a cloud storage service and/or a cloud connection service.

Further, computing platform 200 includes one or more computing processor devices 204, which may be an application-specific integrated circuit ("ASIC"), or other chipset, logic circuit, or other data processing device. Computing processor device(s) 204 may execute one or more application programming interface (APIs) 206 that interface with any resident programs, such as monitoring engine 300, AI-based prediction engine 400, trust indicator generator engine 500, data decisioning engine 600 or the like, stored in memory 202 of computing platform 200 and any external programs. Computing platform 200 includes various processing sub-systems (not shown in FIG. 3) embodied in hardware, firmware, software, and combinations thereof, that enable the functionality of computing platform 200 and the operability of computing platform 200 on a distributed communication network, such as distributed communication network 110 shown in FIG. 1. For example, processing sub-systems allow for initiating and maintaining communications and exchanging data with other networked devices. For the disclosed aspects, processing sub-systems of computing platform 200 includes any processing sub-system portion used in conjunction with monitoring engine 300, AI-based prediction engine 400, trust indicator generator engine 500, data decisioning engine 600 and sub-engines, tools, routines, sub-routines, applications, sub-applications, sub-modules thereof.

In specific embodiments of the present invention, computing platform 200 additionally includes a communications module (not shown in FIG. 3) embodied in hardware, firmware, software, and combinations thereof, that enables electronic communications between components of computing platform 200 and other networks and network devices. Thus, communication module includes the requisite hardware, firmware, software and/or combinations thereof for establishing and maintaining a network communication connection with one or more devices and/or networks.

As previously discussed in relation to FIG. 1, memory 202 stores monitoring engine 300, which is executable by at least one of the computing processor device(s) 204. Monitoring engine is configured to monitor for data instances 310, such as data transfers, data exchanges, data advancements or the like incurred by each of a plurality of linked data users 120. In specific embodiments of the invention data comprises resources, such as financial funds or the like. In such embodiments of the invention, the data instances may include, but are not limited to, financial transactions, including, but not limited to, fund transfers, fund exchanges, fund advancements (i.e., loans) or the like. In specific embodiments of the invention, the linked data users may be family members, business associates or the like.

Memory 202 of computing platform 200 additionally stores an Artificial Intelligence (AI)-based prediction engine 400, which is executable by at least one of the computing processing device 204. AI-based prediction engine 400 is configured to receive, from the monitoring engine 300 the data instances 310 incurred by each of the plurality of linked data users 120 and, in response, implement one or more Machine Learning (ML) models 410 to predict future data instances 420 likely to be incurred by each of the plurality of linked data users 120 based, at least, on the data instances 310 incurred by each of the plurality of linked data users 120. For example, predicting future data transfers, data exchanges, data advancements and the like and the timing for such future data instances. In specific embodiments of the invention, in which the data comprises resources, such as financial funds or the like, future data instances may comprise, but are not limited to, fund transfers, fund exchanges, fund advancements (i.e., loans) or the like. For example, if a user has yet to purchase a home and the monitored data instances indicate that the user will be able to afford a home in the future, the prediction engine 400 may predict a future fund advancement (i.e., loan) for the home and the timing for such a fund advancement.

Memory 202 of computing platform 200 further stores trust indicator generation engine 500, which is executable by at least one of the computing processor device(s) 204. Trust indication generation engine 500 is configured to receive, from the monitoring engine 300, the data instances 310 incurred by each of the plurality of linked data users 120 and, from the AI-based prediction engine 400, the predicted future data instances 420 likely to be incurred by each of the plurality of linked data users 120. In response to receiving the data instances 310 and the predicted future data instances 420, trust indicator generation engine 500 is configured to generate a holistic group trust indicator 510 for the plurality (i.e., group) of linked data users 120 based, at least, on the data instances 310 incurred by each of the plurality of linked data users 120 and the predicted future data instances 420 likely to be incurred by each of the plurality of linked data users 120. The holistic group trust indicator 510 indicates the data advancement worthiness of the plurality of linked data users 120 (i.e., the data advancement worthiness of the group of users). In specific embodiments of the invention, in which data comprises resources, such as financial funds, the holistic group trust indicator 510 may be a holistic trust score or the like that indicates the credit worthiness of the linked users 120.

In specific embodiments of the invention, trust indicator generation engine 500 is configured to continuously receive the data instances 310 and the predicted future data instances 420. In such embodiments of the invention, trust indicator generation engine 500 is further configured to continuously and dynamically update the holistic group trust indicator 510 such that the holistic group trust indicator 510 reflects current data instances 310 and dynamic/current predicted future data instances 420 of the linked data users 120.

In further specific embodiments of the invention, trust indicator generation engine 500 is further configured to generate an individual user trust indicators 520 for each of the plurality (i.e., group) of linked data users 120 based, at least, on the data instances 310 incurred by the corresponding linked data users 120 and the predicted future data instances 420 likely to be incurred by the corresponding linked data users 120. The individual user trust indicator 520 indicates the data advancement worthiness of the individual user from amongst the linked data users 120. In specific embodiments of the invention, in which data comprises resources, such as financial funds, the individual user trust indicator 520 may be a trust score or the like that indicates the credit worthiness of the user. In specific related embodiments of the invention, in which trust indicator generation engine 500 is configured to continuously receive the data instances 310 and the predicted future data instances 420, trust indicator generation engine 500 is further configured to continuously and dynamically update the individual user trust indicator 520 such that the individual user trust indicator 520 reflects current data instances 310 and dynamic/current predicted future data instances 420 of the individual data user.

In specific embodiments of the invention, trust indicator generation engine 500 is stored in an isolated sandbox 202-1 of memory 202, such that outputs resulting from the trust indicator generation engine 500 (i.e., the aforementioned trust indicators 510 and 520) are isolated and unknown to other internal and external engines, applications, networked entities and the like. As discussed in relation to FIG. 2, in other embodiments of the invention, the holistic group trust indicator 510 and/or the individual user trust indicators 520 are stored in the isolated sandbox 202-1 of memory 202, such that the initial indicators and updates to the indicators are isolated and unknown to other internal and external engines, applications, networked entities and the like.

Memory 202 of computing platform 200 additionally stores data decisioning engine 600, which is executable by at least one of the computing processor device(s) 204. Data decisioning engine 500 is configured receive a data advancement request 610-1 or first data guarantee request 620-1 associated with at least two of the plurality of linked data users 120-1. In response to receiving data advancement request 610-1 or data guarantee request 620-1, decision the data advancement request 610-1 or first data guarantee request 620-1 based, at least, on the holistic group trust indicator 510. Decisioning provides for authorizing or denying the data advancement request 610-1 or data guarantee request 620-1. In specific embodiments of the invention, in which data comprises a resource, such as financial funds or the like, the data advancement request 610-1 may be a fund advancement request, such as a loan request or the like and the data guarantee 620-1 may be a surety request or the like.

In further specific embodiments of the invention, data decisioning engine 600 is configured to receive a data advancement request 610-2 or a data guarantee request 620-1 associated with one of the plurality of linked data users. In response to receiving data advancement request 610-2 or a data guarantee request 620-2, data decisioning engine 600 is configured to decision the data advancement request 610-2 or data guarantee request 620-2 based at least on the individual user trust indicator 520 associated with the one of the plurality of linked data users 120. Decisioning provides for authorizing or denying the data advancement request 610-2 or data guarantee request 620-2. In specific embodiments of the invention, in which data comprises a resource, such as financial funds or the like, the data advancement request 610-2 may be a fund advancement request, such as a loan request or the like and the data guarantee 610-2 may be a surety request or the like.

In specific embodiments of the invention, data decisioning engine 600 is stored in an isolated sandbox 202-1 of memory 202, such that outputs resulting from the data decisioning engine 600 are isolated and unknown to other internal and external engines, applications, networked entities and the like. In this regard, according to specific embodiments, decisions resulting from the data decisioning engine 600 have no impact on group trust indicator 510 and/or the user trust indicators 520.

Referring to FIG. 4, a flow diagram is depicted of a method 700 for holistic trust indication, in accordance with embodiments of the present invention. At Event 710, data instances, incurred by each of a plurality of linked users, are monitored. Data instances may include, but are not limited to, data acquisitions, data transfers, data exchanges, data advancements or the like. In specific embodiments of the invention data comprises resources, such as financial funds or the like. In such embodiments of the invention, the data instances may include, but are not limited to, financial transactions, including, but not limited to, fund acquisitions, fund transfers, fund exchanges, fund advancements (i.e., loans) or the like. In specific embodiments of the invention, the linked data users may be family members, business associates or the like.

At Event 720, machine-learning (ML) model(s) is/are implemented to predict future data instances likely to be incurred by each of the linked data users. The ML model(s) is/are trained using the data instances of each of the linked data used resulting from the monitoring. For example, predicting future data transfers, data exchanges, data advancements and the like and the timing for such future data instances. In specific embodiments of the invention, in which the data comprises resources, such as financial funds or the like, future data instances may comprise, but are not limited to, future fund acquisitions, fund transfers, fund exchanges, fund advancements (i.e., loans) or the like.

At Event 730, a holistic group trust indicator is generated for the linked data users based, at least one the data instances incurred by each of the linked data users and the predicted future data instances likely to be incurred by each of the linked data users. The holistic group trust indicator, which may be a score or the like, indicates a level of data advancement worthiness of the group (i.e., the linked data users). In specific embodiments of the invention, in which data comprises resources, such as financial funds, the holistic group trust indicator may be a holistic trust score or the like that indicates the credit worthiness of the linked users. In those embodiments of the method in which the data instances and predicted future data instances are continuously received, the holistic group trust indicator is continuously updated to reflect the current data instances and/or newly predicted future data instances.

At Event 740, a first data advancement request or first data guarantee request, associated with two or more of the linked data users, is received. In specific embodiments of the invention, in which data comprises a resource, such as financial funds or the like, the data advancement request 610-1 may be a fund advancement request, such as a loan request or the like and the data guarantee 620-1 may be a surety request or the like. It should be noted that in specific embodiments of the invention, Event 740 occurs prior to Event 730, in this regard receipt of the first data advancement request or first data guarantee request is a trigger for dynamically generating the holistic group trust indicator. In specific embodiments of the method, the receipt of the first data advancement request or first data guarantee request triggers receipt of the most recent data instance data and predicted future data instance data, such that the dynamic/on-the-fly generated holistic group trust indicator reflects the most recent data instances and most recent predicted future data instances.

At Event 750, the first data advancement request or first data guarantee request is decisioned based, at least, on the holistic group trust indicator. Decisioning provides for authorizing or denying the data advancement request or data guarantee request. In specific embodiments of the method, in which data comprises a resource, such as financial funds or the like, the data advancement request may be a fund advancement request, such as a loan request or the like and the data guarantee may be a surety request or the like.

Thus, as described in detail above, present embodiments of the invention include systems, methods, computer program products and/or the like that provide for a holistic group trust indicator for linked users that has multi-situational application. Data instances incurred by the linked users are monitored and AI including ML is implemented to predict future data instances likely to be incurred by the linked users. In response, a holistic group trust indicator is generated for the linked users that is based, at least, on the actual and predicted future data instances. In response to a data advancement/guarantee request associated with two or more of the linked users, a decision is made on the data advancement/guarantee based, at least, on the holistic group trust indicator. In specific embodiments of the invention, the holistic group trust indicator is generated dynamically when a data advancement/guarantee request is received (i.e., on-the-fly). While in other embodiments of the invention, actual data instance and predicted future data instance are continuously received and the holistic group trust indicator is continuously/constantly updated. In addition, the decisioning application and/or holistic group trust indicator may be isolated/sandboxed so that decisions based on the holistic group trust indicator or updates to the holistic group trust indicator do not impact trust indicators on the individual user-level.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for holistic trust indication, the system comprising:

a computing platform including a memory and one or more computing processor devices in communication with the memory, wherein the memory stores:

a monitoring engine executable by at least one of the one or more computing processor devices and configured to monitor for data instances incurred by each of a plurality of linked data users;

an Artificial Intelligence (AI)-based prediction engine executable by at least one of the one or more computing processor devices and configured to:

receive from the monitoring engine the data instances incurred by each of the plurality of linked data users, and implement one or more Machine Learning (ML) models to predict future data instances likely to be incurred by each of the plurality of linked data users based, at least, on the data instances incurred by each of the plurality of linked data users;

a trust indicator generation engine executable by at least one of the one or more computing processor devices and configured to:

receive, (i) from the monitoring engine, the data instances incurred by each of the plurality of linked data users and (ii) from the AI-based prediction engine the predicted future data instances likely to be incurred by each of the plurality of linked data users, and generate a holistic group trust indicator for the plurality of linked data users based, at least on the data instances incurred by each of the plurality of linked data users and the predicted future data instances likely to be incurred by each of the plurality of linked data users, wherein the holistic group trust indicator indicates data advancement worthiness of the plurality of linked users; and a data decisioning engine executable by at least one of the one or more computing processor devices and configured to:

receive a first data advancement or a first data guarantee request associated with at least two of the plurality of linked data users, and decision the first data advancement or first data guarantee request based at least on the holistic group trust indicator.

2. The system of claim 1, wherein the trust indicator generation engine is further configured to:

receive notification from the data decisioning engine of the first data advancement or the first data guarantee request, and in response to receiving the notification, receive (i) and (ii) and generate the holistic group trust indicator.

3. The system of claim 1, wherein the trust indicator generation engine is further configured to:

continuously receive, (i) from the monitoring engine, the data instances incurred by each of the plurality of linked data users and (ii) from the AI-based prediction engine the predicted future data instances likely to be incurred by each of the plurality of linked data users, and initially generate and continuously update the holistic group trust indicator for the plurality of linked data users.

4. The system of claim 3, wherein the trust indicator generation engine is configured to:

initially generate and continuously update individual user trust indicators for each of the plurality of linked data users based, at least on the data instances incurred by corresponding ones of the plurality of linked data users and the predicted future data instances likely to be incurred by the corresponding ones of the plurality of linked data users, wherein the individual user trust indicators indicate the data advancement worthiness of each of the plurality of linked users.

5. The system of claim 4, wherein the data decisioning engine is further configured to:

receive a second data advancement or a second data guarantee request associated with one of the plurality of linked data users, and decision the second data advancement or second data guarantee request based at least on the individual user trust indicator associated with the one of the plurality of linked data users.

6. The system of claim 4, wherein the memory comprises an isolated sandbox and wherein the data decisioning engine is stored in the isolated sandbox and decisions on (i) the first data advancement or first data guarantee request made by the data decisioning engine do not result in updates to the individual user trust indicators and (ii) the second data advancement or second data guarantee request made by the data decisioning engine do not result in updates to the holistic group trust indicator.

7. The system of claim 4, wherein the memory comprises an isolated sandbox configured to store the holistic group trust indicator, and wherein the continuous updates to the holistic group trust indicator do not result in updates to the individual user trust indicators.

8. The system of claim 4, wherein the memory comprises an isolated sandbox configured to store the individual user trust indicators and the continuous updates to the individual user trust indicators do not result in updates to the holistic group trust indicator.

9. A computer-implemented method for holistic trust indication, the computer-implemented is method executed by one or more computing processor devices and comprising:

monitoring for data instances incurred by each of a plurality of linked data users;

implementing one or more Machine Learning (ML) models to predict future data instances likely to be incurred by each of the plurality of linked data users based, at least, on the data instances incurred by each of the plurality of linked data users;

generating a holistic group trust indicator for the plurality of linked data users based, at least on the data instances incurred by each of the plurality of linked data users and the predicted future data instances likely to be incurred by each of the plurality of linked data users, wherein the holistic group trust indicator indicates the data advancement worthiness of the plurality of linked users;

receiving a first data advancement or first data guarantee request associated with at least two of the plurality of linked data users; and decisioning the first data advancement or first data guarantee request based at least on the holistic group trust indicator.

10. The computer-implemented method of claim 9, wherein generating the holistic group trust indicator occurs in response to receiving the first data advancement or the first data guarantee request associated with at least two of the plurality of linked data users.

11. The computer-implemented method of claim 9, further comprising:

continuously updating the holistic group trust indicator for the plurality of linked data users based, at least on further data instances incurred by each of the plurality of linked data users and further predicted future data instances likely to be incurred by each of the plurality of linked data users.

12. The computer-implemented method of claim 11, further comprising:

generating individual user trust indicators for each of the plurality of linked data users based, at least on the data instances incurred by corresponding ones of the plurality of linked data users and the predicted future data instances likely to be incurred by the corresponding ones of the plurality of linked data users, wherein the individual user trust indicators indicate the data advancement worthiness of each of the plurality of linked users; and continuously updating the individual user trust indicators for each of the plurality of linked data users based, at least, on further data instances incurred by corresponding ones of the plurality of linked data users and further predicted future data instances likely to be incurred by the corresponding ones of the plurality of linked data users.

13. The computer-implemented method of claim 12, further comprising:

receiving a second data advancement or a data guarantee request associated with one of the plurality of linked data users; and decisioning the second data advancement or second data guarantee request based at least on the individual user trust indicator associated with the one of the plurality of linked data users.

14. The computer-implemented method of claim 12, further comprising:

generating and storing at least one of the holistic group trust indicator and the individual user trust indicators in an isolated sandbox, wherein generating and storing the holistic group trust indicator in the isolated sandbox provides for updates to the holistic group trust indicator not causing updates to the individual user trust indicators and wherein generating and storing the individual user trust indicators in the isolated sandbox provides for updates to the individual user trust indicators not causing updates to the holistic group trust indicators.

15. A computer program product including a non-transitory computer- readable medium, the non-transitory computer-readable medium comprising sets of codes for causing one or more computing devices to:

monitor for data instances incurred by each of a plurality of linked data users;

implement one or more Machine Learning (ML) models to predict future data instances likely to be incurred by each of the plurality of linked data users based, at least, on the data instances incurred by each of the plurality of linked data users;

generate a holistic group trust indicator for the plurality of linked data users based, at least on the data instances incurred by each of the plurality of linked data users and the predicted future data instances likely to be incurred by each of the plurality of linked data users, wherein the holistic group trust indicator indicates the data advancement worthiness of the plurality of linked users;

receive a first data advancement or first data guarantee request associated with at least two of the plurality of linked data users; and decision the first data advancement or first data guarantee request based at least on the holistic group trust indicator.

16. The computer program product of claim 15, wherein the sets of codes for causing the one or more computing devices to generate the holistic group trust indicator occurs in response to the set of codes for causing the one or more computing devices to receive the first data advancement or the first data guarantee request associated with at least two of the plurality of linked data users.

17. The computer program product of claim 15, wherein the sets of codes further includes a set of codes for causing the one or more computing devices to:

continuously update the holistic group trust indicator for the plurality of linked data users based, at least on further data instances incurred by each of the plurality of linked data users and further predicted future data instances likely to be incurred by each of the plurality of linked data users.

18. The computer program product of claim 17, wherein the sets of codes further include sets of codes for causing the one or more computing devices to:

generate individual user trust indicators for each of the plurality of linked data users based, at least on the data instances incurred by corresponding ones of the plurality of linked data users and the predicted future data instances likely to be incurred by the corresponding ones of the plurality of linked data users, wherein the individual user trust indicators indicate the data advancement worthiness of each of the plurality of linked users; and continuously update the individual user trust indicators for each of the plurality of linked data users based, at least, on further data instances incurred by corresponding ones of the plurality of linked data users and further predicted future data instances likely to be incurred by the corresponding ones of the plurality of linked data users.

19. The computer program product of claim 18, wherein the sets of codes further include sets of codes for causing the one or more computing devices to:

receive a second data advancement or a data guarantee request associated with one of the plurality of linked data users; and decision the second data advancement or second data guarantee request based at least on the individual user trust indicator associated with the one of the plurality of linked data users.

20. The computer program product of claim 18, wherein the sets of codes for causing the one or more computing devices to generate the of the holistic group trust indicator and generate the individual user trust indicators occur within an isolated sandbox, and wherein the sets of codes further include sets of codes for causing the one or more computing devices to store the holistic group trust indicator and the individual user trust indicators in the isolated sandbox, wherein generating and storing the holistic group trust indicator in the isolated sandbox provides for updates to the holistic group trust indicator not causing updates to the individual user trust indicators and wherein generating and storing the individual user trust indicators in the isolated sandbox provides for updates to the individual user trust indicators not causing updates to the holistic group trust indicators.

* * * * *